US008145682B2

(12) United States Patent
McSherry et al.

(10) Patent No.: US 8,145,682 B2
(45) Date of Patent: Mar. 27, 2012

(54) DIFFERENTIALLY PRIVATE DATA RELEASE

(75) Inventors: Frank D. McSherry, San Francisco, CA (US); Kunal Talwar, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 259 days.

(21) Appl. No.: 12/712,219

(22) Filed: Feb. 25, 2010

(65) Prior Publication Data

US 2011/0208763 A1    Aug. 25, 2011

(51) Int. Cl.
*G06F 17/30* (2006.01)
(52) U.S. Cl. ........................................ 707/803; 707/706
(58) Field of Classification Search .................. 707/706, 707/803
See application file for complete search history.

(56) References Cited

U.S. PATENT DOCUMENTS

| 7,313,550 | B2* | 12/2007 | Kulkarni et al. | 706/21 |
| 7,424,426 | B2* | 9/2008 | Furui et al. | 704/250 |
| 8,041,058 | B2* | 10/2011 | Kentish et al. | 381/119 |
| 2007/0143289 | A1 | 6/2007 | Dwork et al. | |
| 2009/0119625 | A1* | 5/2009 | Barrows et al. | 716/5 |
| 2009/0182797 | A1 | 7/2009 | Dwork et al. | |
| 2010/0318546 | A1* | 12/2010 | Kenthapadi et al. | 707/759 |

OTHER PUBLICATIONS

Miklau, Gerome, "Analyzing Private Network Data Using Output Perturbation", Retrieved at <<http://www.socialnetsec.com/media/SocialNetSec-Miklau.pdf>>, Sep. 11, 2009, pp. 31.

Dwork, Cynthia, "Differential Privacy in New Settings", Retrieved at <<http://wwww.siam.org/proceedings/soda/2010/SODA10_016_dworkc.pdf>>, 2010, pp. 174-183.
Kodeswaran, et al., "Applying Differential Privacy to Search Queries in a Policy Based Interactive Framework", Retrieved at <<http://aisl.umbc.edu/resources/1250.pdf>>, PAVLAD'09, Nov. 6, 2009, Hong Kong, China, pp. 8.
Dwork, Cynthia, "Differential Privacy: A Survey of Results", Retrieved at <<http://research.microsoft.com/pubs/74339/dwork_tamc.pdf>>, 2008, pp. 1-19.
Dwork, et al. "Differential Privacy for Statistics: What we Know and What we Want to Learn", Retrieved at <<http://www.cse.psu.edu/~asmith/pubs/2008/DworkSmith.pdf>>, Jan. 14, 2009, pp. 1-16.
Gupta, et al., "Differentially Private Combinatorial Optimization", Retrieved at <<http://www.slam.org/proceedings/soda/2010/SODA10_090_guptaa.pdf>>, Oct. 11, 2009, pp. 1106-1125.
Dwork, et al. "Differentially Private Marginals Release with Mutual Consistency and Error Independent of Sample Size", Retrieved at <<http://epp.eurostat.ec.europa.eu/portal/page/portal/conferences/documents/unece_es_work_session_statistical_data_conf/TOPIC%202-WP.19%20IP%20DWORK.PDF>>, Dec. 17-19, 2007, pp. 1-12.

* cited by examiner

*Primary Examiner* — Cheryl Lewis
(74) *Attorney, Agent, or Firm* — Microsoft Corporation

(57) ABSTRACT

A query log includes a list of queries and a count for each query representing the number of times that the query was received by a search engine. In order to provide differential privacy protection to the queries, noise is generated and added to each count, and queries that have counts that fall below a threshold are removed from the query log. A distribution associated with a function used to generate the noise is referenced to determine a distribution of a number of times that a hypothetical query having a zero count would have its count exceed the threshold after the addition of noise. Random queries of an amount equal to a sample from the distribution of number of times are added to the query log with a count that is greater than the threshold count.

20 Claims, 5 Drawing Sheets

DIFFERENTIALLY PRIVATE DATA RELEASE

BACKGROUND

A query log contains valuable information about the searches and corresponding actions performed by users as they interact with a search engine. For example, a web query log collects queries and clicks of users issued to an Internet search engine. Alternatively, a query log may contain queries issued by users and actions performed on the displayed results (e.g., logs for enterprise search, mobile search, database search, product catalog search/transactions, and so forth).

A query log can be very useful for providing access to customer services. For example, accessing a query log can help a company improve existing products and services (e.g., keyword advertising) and build new products and services.

Moreover, query logs are valuable data sources that are currently not available to the research community. For example, in many instances an Internet query log is more useful than a web crawl or document repositories as the query log may be used to understand the behavior of users posing queries, and to obtain algorithms for problems such as computing related searches, making spelling corrections, expanding acronyms, determining query distributions, query classification, and/or tracking the change of query popularity over time. Advertisers can use such a log to understand how users navigate to their web pages, to gain an understanding of their competitors, and to improve keyword advertising campaigns.

However, a query log contains a considerable amount of private information about individuals, and thus a search company cannot simply release such data. Indeed, user searches provide an electronic trail of confidential thoughts and identifiable information. For example, users may enter their own name or the names of their friends, home address, and their medical history as well as of their family and friends. In the case of web query logs, users may enter their credit card number and/or social security number as a search query, just to find out what information is present on the web.

In sum, releasing a query log is beneficial for various data-mining tasks; however, doing so risks compromising user privacy. Previous attempts to release query logs while maintaining privacy have failed. One attempt replaced user names with random identifiers; however, the searches were easy to match to an individually identifiable person based on the rest of the data. Other ad-hoc techniques, such as tokenizing each search query and securely hashing the token into an identifier, have been explored in the literature and are shown not to protect privacy.

SUMMARY

A query log includes a list of queries and a count for each query representing the number of times that the query was received by a search engine. In order to provide differential privacy protection to the queries, noise is generated and added to each count, and queries that have counts that fall below a threshold count are removed from the query log. In addition, a distribution associated with a function used to generate the noise is referenced to determine a distribution of a number of times that a hypothetical query having a zero count would have its count exceed the threshold count after the addition of noise. Random queries of an amount determined by the distribution of the number of times are added to the query log with a count that is greater than the threshold count. By generating the random queries according to the distribution, computational resources are preserved by not generating all possible queries and adding noise to a count associated with each query.

In an implementation, a list of strings is received at a computing device through a network. The list of strings includes a plurality of strings and a count associated with each string. A threshold count is selected by the computing device. A distribution of a number of times that noise generated by a noise generating function would exceed the threshold is determined. A number of strings are generated according to the determined distribution of the number of times. A count is generated for each generated string by the computing device. The generated strings and generated counts are added to the list of strings by the computing device.

Implementations may include some or all of the following features. Prior to adding the generated strings and generated counts to the list of strings, and for each string in the list of strings, noise may be generated by the computing device using the noise generating function, and the generated noise may be added to the count associated with the string. Strings from the list of strings with an associated count that is less than the threshold count may be removed. The list of strings may be provided through the network by the computing device. The list of strings may be a query log. The noise generating function may generate noise according to a Laplacian distribution or a Gaussian distribution. The strings in the list of strings may be compressed. The strings may be compressed using Huffman coding. Each string may include characters from a set of characters and each string may have a maximum length. Selecting a threshold count may include selecting a threshold count that is the maximum length times the natural log of the number of characters from the set of characters.

In an implementation, a list of strings is received by a computing device. The list of strings includes identifiers of strings and a count associated with each string, and each string further has an associated length. A first length is selected by the computing device. A first threshold count is determined based on the first length by the computing device. For each string in the list of strings with an associated length equal to the first length, noise is generated using a noise generating function, and the generated noise is added to the count associated with the string. Strings of a length equal to the first length with a count that is less than the first threshold count are removed from the list of strings. A distribution of a number of times that the generated noise by the noise generating function would exceed the first threshold count is determined. A number of strings of length equal to the first length are generated according to the distribution of the number of times. A count is generated for each generated string by the computing device. The generated strings and generated counts are added to the list of strings by the computing device.

Implementations may include some or all of the following features. A second length may be selected. A second threshold count may be determined based on the second length. For each string in the list of strings with an associated length equal to the second length, noise may be generated using a noise generating function, and the generated noise may be added to the count associated with the string. Identified strings from the list of strings of a length equal to the second length with a count that is less than the second threshold count may be removed from the list of strings. A distribution of a number of times that the generated noise would exceed the second threshold may be determined. A number of strings of a length equal to the second length may be generated according to the determined distribution. A count may be generated for each generated string. The generated strings and generated counts may be added to the list of strings. Each string may include characters from a set of characters, and selecting the first threshold count may include selecting a first threshold count that is the first length times the natural log of the number of characters from the set of characters.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
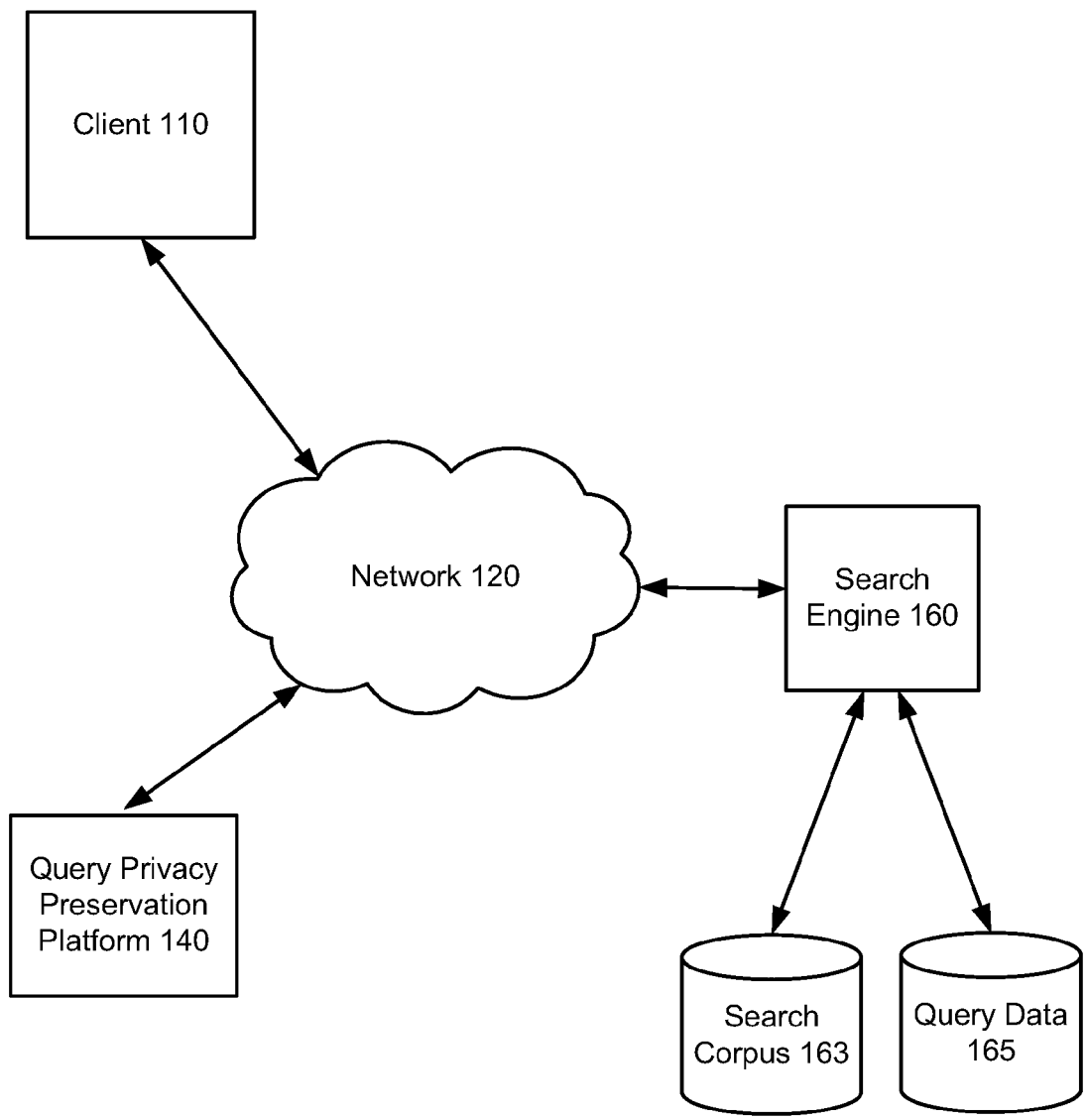
FIG. 1 is an illustration of an exemplary environment for providing differential privacy protection to lists of strings.

FIG. 1 is an illustration of an exemplary environment 100 for providing differential privacy protection to lists of strings. A client 110 may communicate with one or more search engines 160 through a network 120. The client 110 may be configured to communicate with the search engine 160 to access, receive, retrieve and display media content and other information such as web pages and websites. The network 120 may be a variety of network types including the public switched telephone network (PSTN), a cellular telephone network, and a packet switched network (e.g., the Internet).

Figure 5:
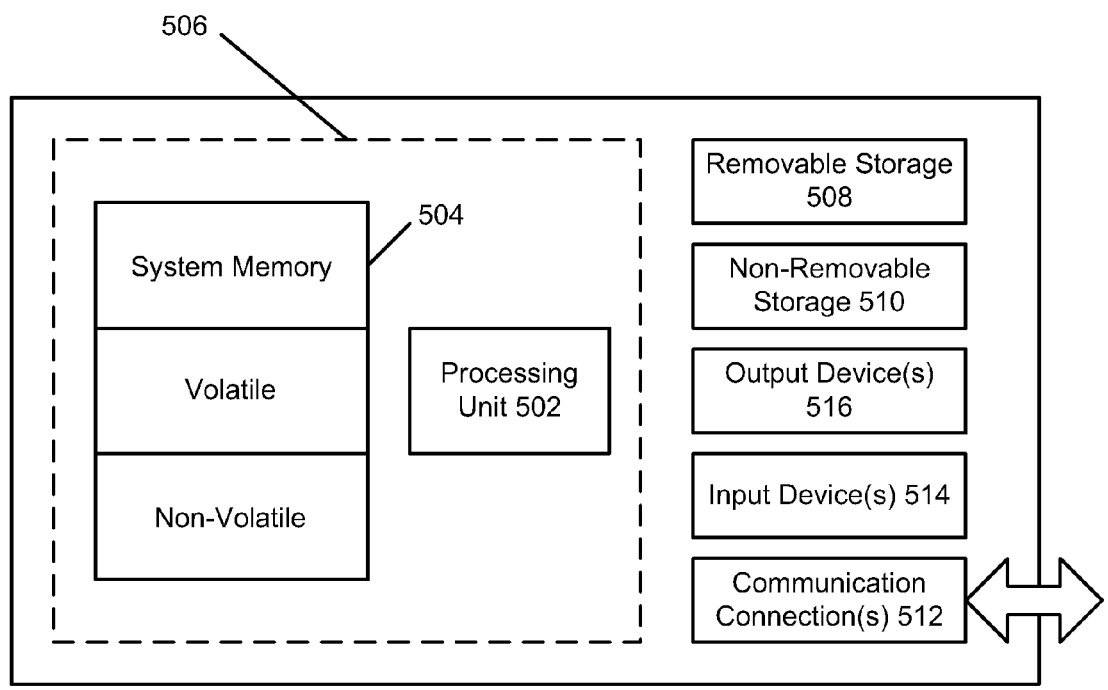
FIG. 5 shows an exemplary computing environment.

In some implementations, the client 110 may include a desktop personal computer, workstation, laptop, PDA, cell phone, or any WAP-enabled device or any other computing device capable of interfacing directly or indirectly with the network 120 such as the computing device 500 illustrated in FIG. 5. The client 110 may run an HTTP client, e.g., a browsing program, such as MICROSOFT INTERNET EXPLORER or other browser, or a WAP-enabled browser in the case of a cell phone, PDA or other wireless device, or the like, allowing a user of the client 110 to access, process and view information and pages available to it from the search engine 160.

The search engine 160 may be configured to receive queries from users using clients such as the client 110. The search engine 160 may search for media responsive to the query by searching a search corpus 163 using the received query. The search corpus 163 may be an index of media such as web pages, product descriptions, image data, video data, map data, etc. The search engine 160 may return a web page to the client 110 including links to some or all of the media that is responsive to the query.

In some implementations, the search engine 160 may store some or all of the queries that it receives as query data 165. For example, the query data 165 may include a database or list of strings with each string corresponding to a received query. A variety of other data may be stored with each query including, but not limited to, an indicator of a time that the query was received and/or an identifier of a user that submitted the query, for example. In some implementations, the query data 165 may comprise a query log. The query log may include some or all of the queries received by the search engine 160 for some period of time. In some implementations, a query log includes strings corresponding to received queries along with counts of the number of times each query was received.

Queries in the query data 165 may comprise strings made up of a plurality of characters. The number of characters in a string is known as the length of the string. Typically, a search engine 160 only supports queries up to some maximum length. For example, the search engine 160 may only accept queries up to 255 characters in length. The universe of characters that may appear in a string is referred to herein as an alphabet. Typical alphabets include the letters of the English alphabet plus other characters such spaces, numbers, etc. Any language or character set may be supported.

As described above, a query log contains valuable information, but the disclosure of such information presents privacy concerns for users who submitted the queries. Even if the identity of the users who submitted the queries is removed from the query log, inferences may be made about user identities and/or user behaviors based on the presence or absence of particular queries in the query log. A system that protects against such inference is said to provide differential privacy protection. More specifically, a system is said to provide differential privacy if the presence or absence of a particular record or value in a data set cannot be determined based on an output of the system.

The environment 100 may further include a query privacy preservation platform 140. The query privacy preservation platform 140 may provide differential privacy protection to a query log such that the query log may be released by the search engine 160 with a differential privacy guarantee.

Typically, systems provide differential privacy protection through the addition of noise to values or records output by the system. The noise may be generated by a noise generating function and may be Laplacian noise or Gaussian noise. The level of differential privacy protection provided by a system is referred to as $\epsilon$. Generally, the smaller the value of $\epsilon$, the greater the differential privacy protection afforded by the system. In some implementations, the query privacy preservation platform 140 may provide differential privacy protection to a query log (or any list of strings) by adding generated noise to the counts associated with each query in the query log.

Before releasing the query log, a threshold count may be selected by the user or operator of the query privacy preservation platform 140. The threshold count may represent a minimum count value for a query in the query log, and the query privacy preservation platform 140 may remove all queries from the query log that fall below the selected threshold count. Because of the addition of noise which can be positive or negative, some queries in the query log may have a count that moves above or falls below the threshold count after the addition of noise. The threshold count may be selected by a user or administrator depending on a purpose or intended usage for the query log. For example, a user may want to see the top 100, 1000, or 10,000 queries and may therefore not be interested in queries having a low count.

In addition, the query privacy preservation platform 140 may further provide differential privacy protection by adding "dummy" queries to the query log. A dummy query is a query that may not have been received by the search engine 160, but is instead randomly generated by the query privacy preservation platform 140. In some implementations, the query preservation platform 140 may generate all possible dummy queries for a query log up to the maximum length supported by the search engine 160. These dummy queries may be added to the query log with an associated count of zero. The dummy queries may not include queries that are already in the query log.

After the addition of noise to the counts associated with the queries in the query log by the query privacy preservation platform, some of the counts associated with the dummy queries may be greater than the selected threshold count. These dummy queries may then become part of the query log that is released by the query privacy preservation platform 140.

While the above described method is effective, the generation and addition of all possible dummy queries to the query log may be a computationally expensive task for the query privacy preservation platform 140. Moreover, because each dummy query has an initial count of zero, even with the addition of noise, few of the dummy queries will be greater than the chosen threshold count and will therefore not be part of the query log that is released.

Given that the noise generated for a count is generated by a noise generating function with a known distribution (e.g., Gaussian distribution or Laplacian distribution), rather than generate all possible dummy queries up to a specified maximum length, the query privacy preservation platform 140 may determine a distribution of a number of times that noise generated by the noise generating function for a count will exceed the selected threshold count. The query privacy preservation platform 140 may then randomly generate a corresponding number of random dummy queries according to the distribution and add them to the query log with corresponding count values that exceed the threshold count. This query log may then be released and may provide the same (or substantially the same) differential privacy protection as the computationally expensive method described above.

For example, for an alphabet of 27 characters (i.e., 26 letters plus a space character) and a maximum string length of 255, there are $27^{255}$ possible dummy queries. Using the distribution of the function used to generate the noise that is added to the counts and a threshold count X, the query privacy preservation platform 140 may determine that the noise generation function, after $27^{255}$ iterations, is expected to generate noise values that exceed the threshold count X 100 times. Thus, rather than generate $27^{255}$ dummy queries and add noise to a count of zero associated with each dummy query, the query privacy preservation platform 140 may generate dummy queries and give them associated count values that are greater than the threshold count X. In some implementations, the query privacy preservation platform 140 may generate the number of queries based on a binomial distribution. For example, the number of queries may be samples from the distribution Binomial ($27^{255}$, ($100/27^{255}$)).

Figure 2:
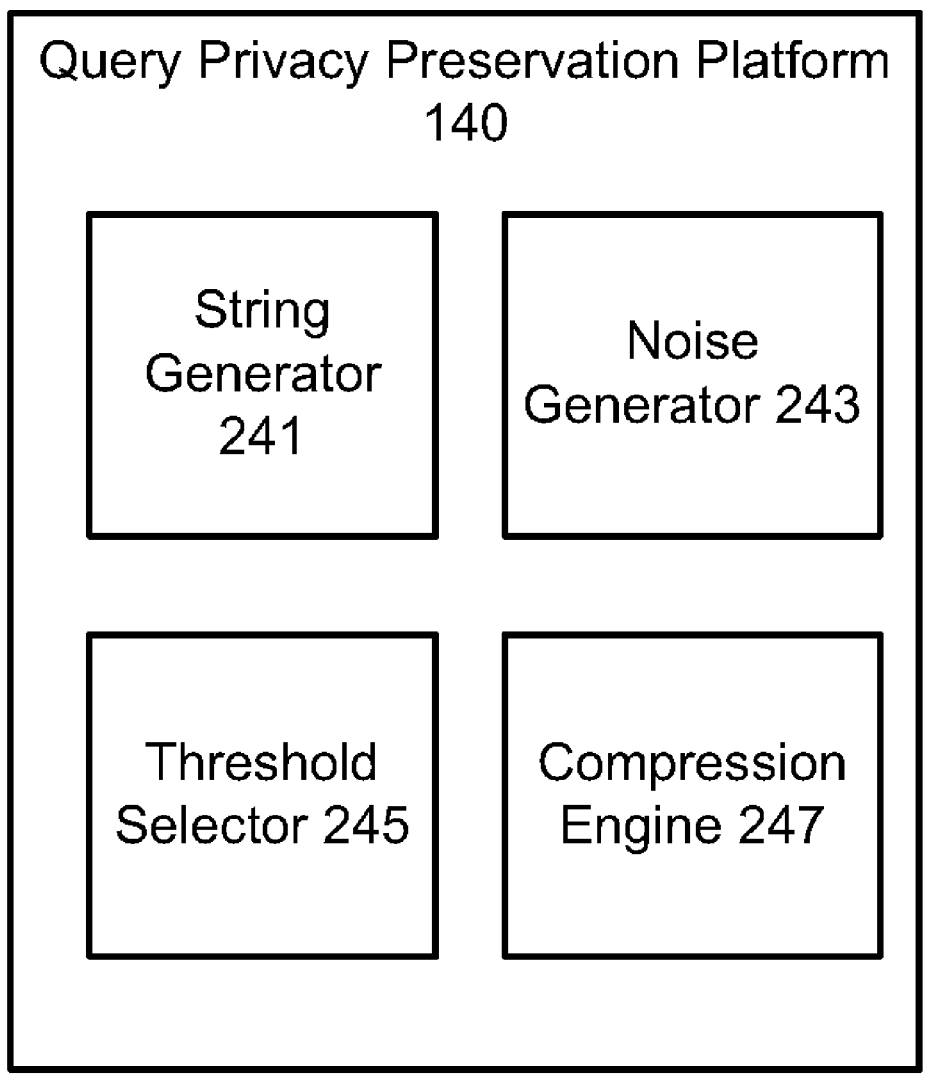
FIG. 2 is an illustration of an example query privacy preservation platform.

FIG. 2 is an illustration of an example query privacy preservation platform 140. The query privacy preservation platform 140 may be implemented using one or more general purpose computing devices such as the computing device 500 illustrated with respect to FIG. 5, for example. In addition, while the query privacy preservation platform 140 is illustrated as including several components, each of the components may be implemented together or separately using one or more computing devices.

The query preservation platform 140 may include a string generator 241. The string generator 241 may generate one or more strings of, or up to, a specified length. For example, the string generator 241 may generate all possible strings of length 255, or may generate all possible strings of length ten (or another length). The number of strings generated for a particular length may depend on the number of characters in the alphabet that the string is generated from. Any system, method, or technique for generating strings may be used.

The string generator 241 may also generate a specified number of strings of a specified length. For example, the query preservation platform 140 may instruct the string generator 241 to generate four strings of length 100. The generated strings may be randomly selected from the set of all possible strings of the specified length given an alphabet excluding the strings that are already in the query log and without repetition. Any method for randomly selecting a string may be used. The generated strings may be used as dummy queries to add to a query log by the query privacy preservation platform 140, for example.

The query privacy preservation platform 140 may further include a noise generator 243. The noise generator 243 may use a noise generation function to generate noise values. In some implementations, the noise generation functions may generate noise according to a Laplacian or a Gaussian distribution. The amount of noise generated by the noise generator 243 and/or the size of the distribution of the generated noise may be dependent on the amount of differential privacy wanted. The level of differential privacy provided may be adjusted by adjusting the value of $\epsilon$ used by the noise generator 243.

In some implementations, the noise generator 243 may generate a distribution describing the frequency with which particular noise values will be generated by the noise generator 243. The frequency may be used by the query privacy preservation platform 140 to determine a distribution of a number of generated noise values that will exceed a selected threshold count. For example, in an alphabet having 27 characters (i.e., the letters of the English alphabet plus a character for spaces), there are $27^{255}$ possible strings of length 255. The query privacy preservation platform 140 may use the generated frequency to determine the distribution of the number of times that the noise generator 243 will generate a noise value that is greater than a selected threshold out of $27^{255}$ generated noise values. The distribution of the number of times may be used to determine how many random strings to generate by the string generator 241 to add as dummy queries to a query log.

The query privacy preservation platform 140 may further include a threshold selector 245. In some implementations, the threshold selector 245 may select a threshold count to use as a cut-off for queries in the query log. For example, any query in the query log with a count that is below the threshold count may be discarded. In some implementations, a single threshold may be used for all queries in the query log. The threshold count may be selected so that the number of generated dummy queries by the string generator 241 is approximately the inverse of the total number of possible strings using the alphabet. Thus, the threshold count may be determined from the frequency generated by the noise generator 243 and the total number of strings in the alphabet, for example. Other methods for selecting the threshold count may be used. In some implementations, the threshold count may be computed as the natural log of the size of the character alphabet times the maximum amount of supported characters in a query. Thus, for queries from an alphabet of 27 characters having a maximum length of 255 characters, the threshold may be computed as 255×ln(27). Moreover, in some implementations the computed threshold may be divided by $\epsilon$.

In other implementations, a different threshold count may be used for queries of different lengths in the query log. For example, queries of length four may be removed from the query log if their count is below a first threshold count, and queries of length five may be removed from the query log if their count is below a second threshold count. In general, queries having a shorter length are more prevalent in a query log than queries having a longer length. For example, search engines may receive a large number of five character queries and a very small number of 255 character queries. In addition, because there are more strings in the query log that have a shorter length, there are fewer candidate dummy strings because only dummy strings that are not already in the query log may be generated. Accordingly, the selected threshold count may be increased based on the length of the query to limit the number of possible false positives. In some implementations, the selected threshold count may be computed as the length of the query multiplied by the natural log of the size of the character alphabet. Thus, for ten character queries using an alphabet of 27 possible characters, the threshold count may be computed as 10×ln(27). Other methods for calculating the threshold count may be used.

The query privacy preservation platform 140 may further include a compression engine 247. The compression engine 247 may compress one or more of the queries in the query log. In many languages such as English, the various words and phrases that may make up queries include redundant information. This redundant information may be exploited and used to compress the queries into smaller strings. By compressing the queries in the query log, a greater number of queries may be released or provided in the query log because the threshold count used to filter may be reduced. The queries in the query log may be decompressed by the compression engine 247 prior to releasing or providing the query log by the query privacy preservation platform 140. Any one of a variety of text compression methods may be used such as Huffman coding, for example.

Figure 3:
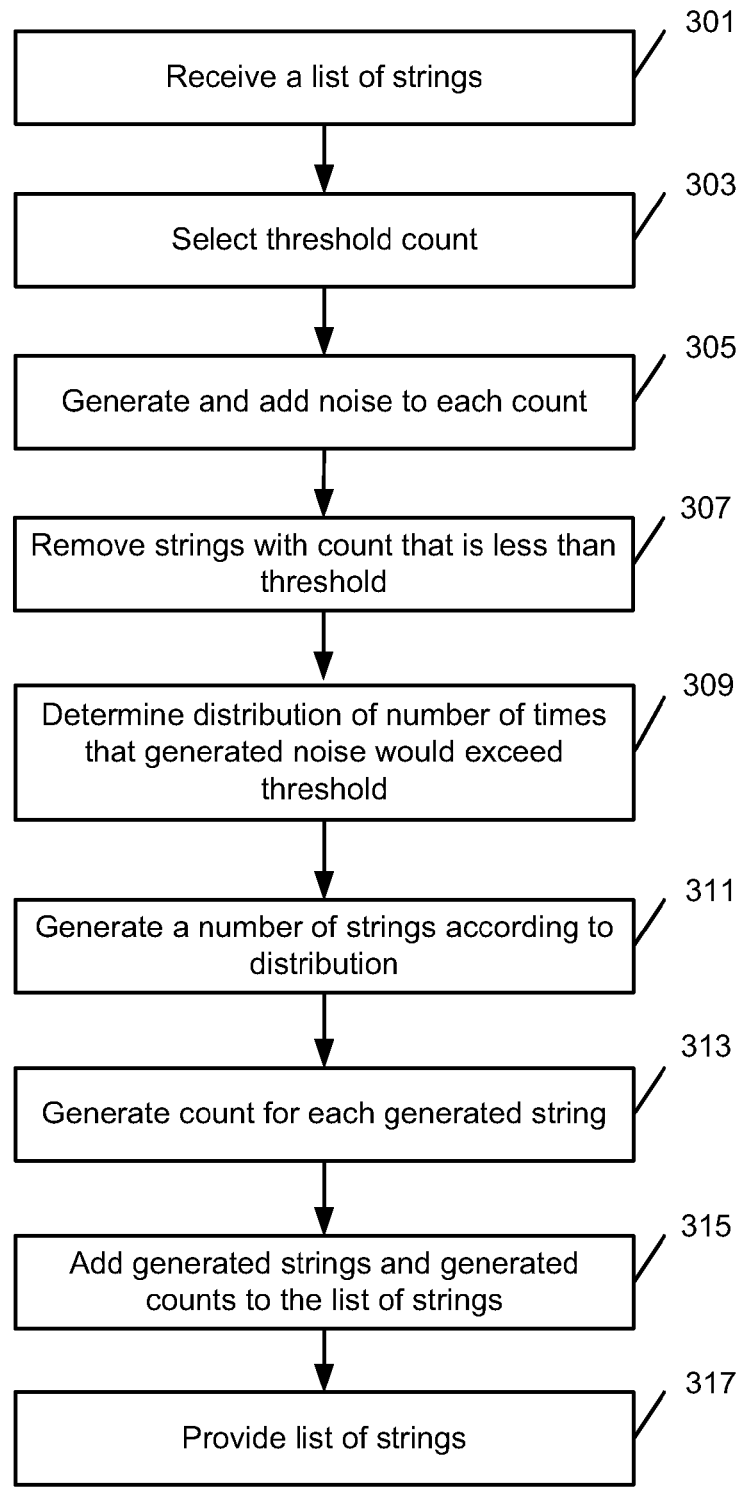
FIG. 3 is an operational flow of an implementation of a method for providing differential privacy protection to a list of strings.

FIG. 3 is an operational flow of a method 300 for providing differential privacy protection to a list of strings. The method 300 may be implemented by the query privacy preservation platform 140, for example.

A list of strings is received (301). The list of strings may be received by the query privacy preservation platform 140 from the search engine 160. In some implementations, the list of strings may be a query log and may include a plurality of received queries along with an associated count that describes the number of times each query was received. There may be a maximum length for each string in the list of strings that corresponds to a maximum string size supported by the search engine 160. For example, the maximum string length may be 255. Other maximum lengths may also be supported. Moreover, each string may be made up of characters from a particular alphabet. For example, the alphabet may be the English alphabet plus a space character. Other alphabets may also be used.

A threshold count is selected (303). The threshold count may be selected by the threshold selector 245 of the query privacy preservation platform 140. In some implementations, the threshold count may be selected such that the number of dummy strings may be generated using the alphabet. Thus, the threshold count may be determined according to a distribution of the function used to generate the noise that is added to the counts associated with the strings. In some implementations, the threshold count may be calculated as the natural log of the number of characters in the alphabet used to generate the strings multiplied by the maximum string length.

In some implementations, the strings in the list of strings may further be compressed. The strings may be compressed by the compression engine 247. The strings may be compressed to remove redundant information and therefore reduce the overall length of the strings in the list of strings. Any method or technique for compressing strings, such as Huffman encoding for example, may be used.

Noise is generated and added to each count (305). The noise may be generated by the noise generator 243 of the query privacy preservation platform 140. The noise may be generated using a Laplacian or a Gaussian noise generation function. The noise may be added to each count associated with a string in the list of strings.

Strings with a count that is less than the threshold count are removed (307). The strings may be removed from the list of strings by the query privacy preservation platform 140.

A distribution of a number of times that generated noise would exceed threshold count is determined (309). The distribution of the number of times may be determined by the noise generator 243 of the query privacy preservation platform 140. As described previously, rather than generate and add all possible strings to the list of strings as dummy strings and count the number of counts associated with each string that exceeds the threshold count, the query privacy preservation platform 140 may determine the distribution of the number of dummy strings whose count would exceed the threshold count, and may then add a number of dummy strings to the list of strings corresponding to the distribution. The distribution may be determined from a distribution of the function used by the noise generator 243 to generate the noise at 305, for example. The distribution may be a binomial distribution.

A number of strings are generated according to the distribution of the number of times (311). The number of strings may be generated by the string generator 241 of the query privacy preservation platform 140. The number of strings that are generated may be determined using the binomial distribution, for example. The strings may be generated using a variety of known techniques for randomly generating strings. The strings may be randomly generated from the universe of possible strings corresponding to the alphabet and a maximum length string of the received list of strings. Because the strings are randomly generated, one or more of the generated strings may be a string that was actually received by the search engine 160. However, because of the large number of strings in the universe of possible strings it is unlikely that any of the generated strings will be the same as a string that was actually received.

A count is generated for each generated string (313). The counts may be generated by the query privacy preservation platform 140 for each of the generated strings. Each generated count may be larger than, or equal to, the selected threshold count and may be generated according to the distribution of the noise generating function.

The generated strings and associated counts are added to the list of strings (315). The generated strings may be added to the list of strings by the query privacy preservation platform 140. In implementations where one or more of the strings in the list of strings were compressed, the strings may be decompressed.

The list of strings is provided (317). The list of strings may be provided by the query preservation platform 140 to a requesting user or provided for publication. Because of the addition of noise to the counts of the strings, as well as the generated dummy strings, the differential privacy of the list of strings is protected because a user may not be able to make inferences regarding the presence or absence of a particular string in the list of strings.

Figure 4:
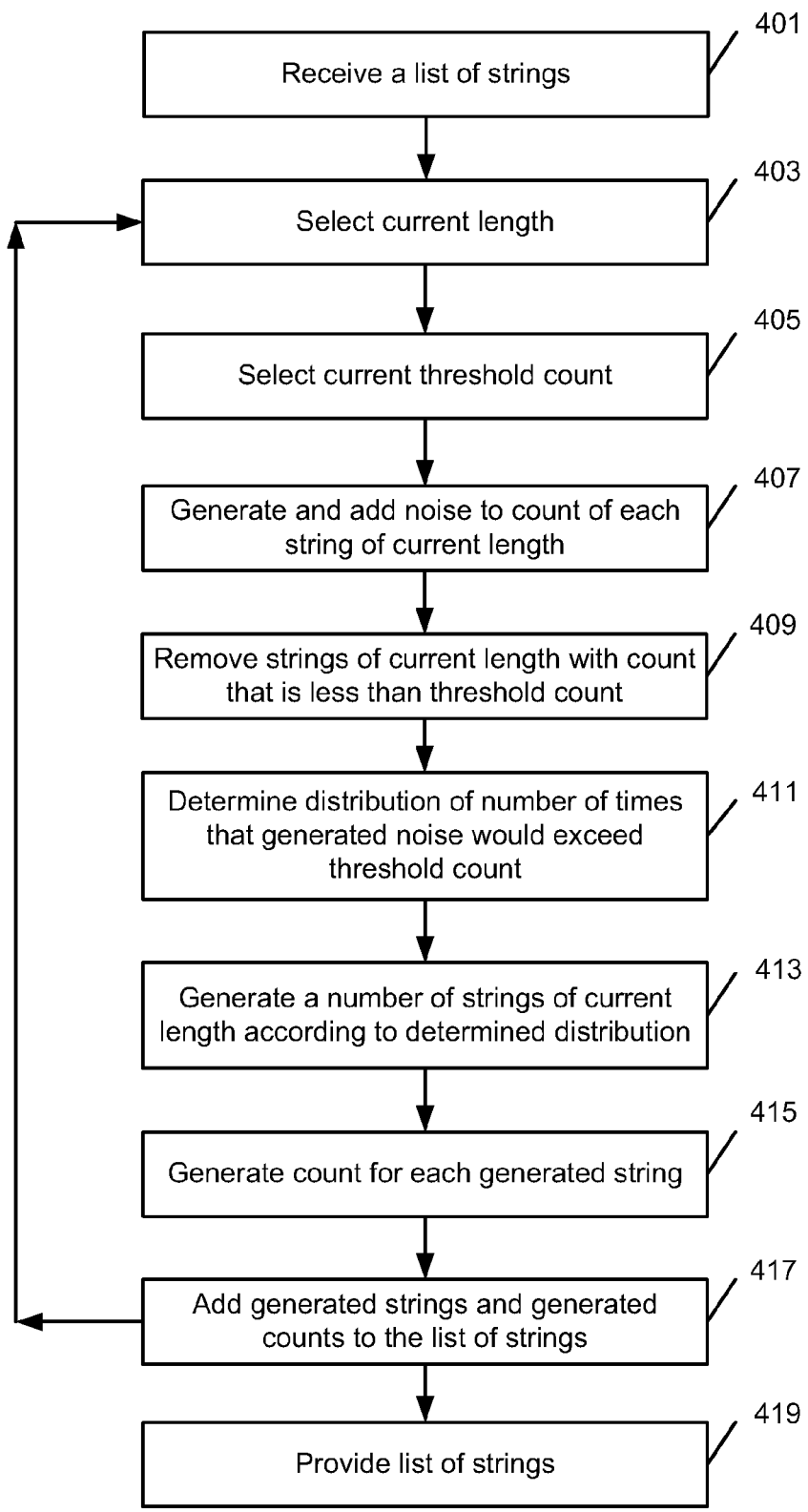
FIG. 4 is an operational flow of another implementation of a method for providing differential privacy protection to a list of strings.

FIG. 4 is an operational flow of a method for providing differential privacy protection to a list of strings. The method 400 may be implemented by the query privacy preservation platform 140.

A list of strings is received (401). The list of strings may be received by the query privacy preservation platform 140 from the search engine 160. In some implementations the list of strings may comprise a query log and may include a plurality of queries along with an associated count that describes the number of times each query was received. There may be a maximum length for each string in the list of strings that corresponds to the maximum string size supported by the search engine 160. For example, the maximum string length may be 255. Other maximum lengths may also be supported. Moreover, each string may be made up of characters from a particular alphabet. For example, the alphabet may be the English alphabet plus a space character. Other alphabets may also be used.

A current length is selected (403). The current length may be selected by the query privacy preservation platform 140. As described above, in one implementation, the threshold count may be varied depending on the length of the string. Accordingly, a current string length may be selected for an iteration of the method 400. The current length may be greater than the string length used at a previous iteration. In some implementations, the current length may be one character greater than a previous length.

A current threshold count is selected (405). The current threshold count may be selected by the threshold selector 245 of the query privacy preservation platform 140. The current threshold count may be selected based on the size of the current string length being considered by the query privacy preservation platform 140. In some implementations, the current threshold count may be the current length multiplied by the natural log of the alphabet size used for the strings from the list of strings. Other methods for calculating the current threshold count may be used.

Noise is generated and added to the count associated with each string of the current length (407). The noise may be generated by the noise generator 243 using a noise generating function.

Strings of the current length with a count that is less than the current threshold count are removed (409). The strings may be removed from the list of strings by the query privacy preservation platform 140.

A distribution of a number of times that generated noise would exceed the current threshold count is determined (411). The distribution of the number of times may be determined by the noise generator 243 of the query privacy preservation platform 140. The distribution of the number may be determined from a distribution of the function used by the noise generator 243 to generate the noise at 407 and the current threshold count, for example. In some implementations, the distribution may be a binomial distribution.

A number of strings of the current length are generated according to the distribution (413). The number of strings may be generated according to the binomial distribution of the number of times. The strings may be generated by the string generator 241 and may each be a string of the current length. Any method or technique for randomly generating a string of a specified length may be used.

A count is generated for each generated string (415). The count may be generated by the query privacy preservation platform 140. Each generated count may be greater than the current threshold count.

The generated strings and counts are added to the list of strings (417). The generated strings and counts may be added to the list of strings by the query privacy preservation platform 140. After adding the generated strings and counts to the list of strings, the method 400 may return to 403 where a new current length is selected. If the current length is a maximum current length, then the method 400 may continue to 419 where the list of strings may be provided.

The list of strings is provided (419). The list of strings may be provided by the query privacy preservation platform 140 to a user. The list of strings may be or comprise a query log, for example.

FIG. 5 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a list of strings at a computing device through a network, wherein the list of strings comprises a plurality of strings and a count associated with each string;
   selecting a threshold count by the computing device;
   determining a distribution of a number of times that noise generated by a noise generating function would exceed the threshold count by the computing device;
   generating a number of strings according to the determined distribution by the computing device;
   generating a count for each generated string by the computing device, wherein the generated count is greater than the threshold count; and
   adding the generated strings and generated counts to the list of strings by the computing device.

2. The method of claim 1, further comprising, prior to adding the generated strings and generated counts to the list of strings, for each string in the list of strings:
   generating noise using the noise generating function; and
   adding the generated noise to the count associated with the string.

3. The method of claim 2, further comprising removing strings from the list of strings with an associated count that is less than the threshold count.

4. The method of claim 1, further comprising providing the list of strings through the network by the computing device.

5. The method of claim 1, wherein the list of strings comprises a query log.

6. The method of claim 1, wherein the noise generating function generates noise according to a Laplacian distribution or a Gaussian distribution.

7. The method of claim 1, further comprising compressing the strings in the list of strings.

8. The method of claim 7, wherein the strings are compressed using Huffman coding.

9. The method of claim 1, wherein the distribution is a binomial distribution.

10. The method of claim 1, wherein each string comprises characters from a set of characters and each string has a maximum length, and further wherein selecting the threshold count comprises selecting the threshold count that is the maximum length multiplied by the natural log of the number of characters from the set of characters.

11. A method comprising:
    receiving a list of strings by a computing device, wherein the list of strings comprises a plurality of strings and a count associated with each string and each string further has an associated length;
    selecting a first length by the computing device;
    determining a first threshold count based on the first length by the computing device;
    for each string in the list of strings with an associated length equal to the first length:
       generating noise using a noise generating function by the computing device; and
       adding the generated noise to the count associated with the string by the computing device;
    removing strings from the list of strings of a length equal to the first length with a count that is less than the first threshold count by the computing device;
    determining a distribution of a number of times that the generated noise by the noise generating function would exceed the first threshold count by the computing device;
    generating a number of strings of length equal to the first length according to the determined distribution by the computing device;
    generating a count for each generated string by the computing device, wherein the generated count for each string is greater than the first threshold count; and
    adding the generated strings and generated counts to the list of strings by the computing device.

12. The method of claim 11, further comprising:
    selecting a second length;
    determining a second threshold count based on the second length;
    for each string in the list of strings with an associated length equal to the second length:
       generating noise using the noise generating function; and
       adding the generated noise to the count associated with the string;

removing strings from the list of strings of a length equal to the second length with a count that is less than the second threshold count;

determining a distribution of a number of times that the generated noise by the noise generating function would exceed the second threshold count;

generating a number of strings of a length equal to the second length according to the determined distribution;

generating a count for each generated string, wherein the generated count for each string is greater than the second threshold count; and adding the generated strings and generated counts to the list of strings.

13. The method of claim 12, further comprising providing the list of strings.

14. The method of claim 11, wherein the list of strings is a query log.

15. The method of claim 11, wherein each string comprises characters from a set of characters, and further wherein selecting the first threshold count comprises selecting a first threshold count that is the first length multiplied by the natural log of the number of characters from the set of characters.

16. The method of claim 11, further comprising compressing the strings in the list of strings.

17. A system comprising:
a search engine that generates a query log, wherein the query log comprises a plurality of queries and a count associated with each query;
a query privacy preservation platform that:
receives the query log;
selects a threshold count;
determines a distribution of a number of times that noise generated by a noise generating function would exceed the threshold count;
generates a number of queries according to the distribution;
generates a count for each generated query, wherein each generated count is greater than the threshold count; and
adds the generated queries and generated counts to the query log.

18. The system of claim 17, wherein the query privacy preservation platform, prior to adding the generated queries and generated counts to the query log, for each query in the query log:
generates noise using the noise generating function; and
adds the generated noise to the count associated with the query.

19. The system of claim 18, wherein the query privacy preservation platform further removes queries from the query log with an associated count that is less than the threshold count.

20. The system of claim 17, wherein the query privacy preservation platform further provides the query log to a computing device through a network.

* * * * *